(12) United States Patent
Simon et al.

(10) Patent No.: US 11,831,771 B2
(45) Date of Patent: Nov. 28, 2023

(54) KEYS FOR ELLIPTIC CURVE CRYPTOGRAPHY

(71) Applicants: STMICROELECTRONICS S.r.l., Agrate Brianza (IT); PROTON WORLD INTERNATIONAL N.V., Diegem (BE)

(72) Inventors: Thierry Simon, Wezembeek-Oppem (BE); Michael Peeters, Tourinnes-la-Grosse (BE); Francesco Caserta, Naples (IT)

(73) Assignees: STMICROELECTRONICS S.r.l., Agrate Brianza (IT); PROTON WORLD INTERNATIONAL N.V., Diegem (BE)

( * ) Notice: Subject to any disclaimer, the term of this patent is extended or adjusted under 35 U.S.C. 154(b) by 122 days.

(21) Appl. No.: 17/506,377

(22) Filed: Oct. 20, 2021

(65) Prior Publication Data

US 2022/0141016 A1    May 5, 2022

(30) Foreign Application Priority Data

Oct. 30, 2020    (EP) .................................... 20425046

(51) Int. Cl.
*H04L 9/30*    (2006.01)
*H04L 9/08*    (2006.01)
*H04L 9/32*    (2006.01)

(52) U.S. Cl.
CPC .......... *H04L 9/3073* (2013.01); *H04L 9/0838* (2013.01); *H04L 9/3247* (2013.01); *H04L 2209/12* (2013.01)

(58) Field of Classification Search
CPC ... H04L 9/3073; H04L 9/0838; H04L 9/3247; H04L 9/0825; H04L 9/3066; H04L 2209/12
See application file for complete search history.

(56) References Cited

U.S. PATENT DOCUMENTS

| | | | |
|---|---|---|---|
| 2016/0248585 A1* | 8/2016 | Yajima | H04L 9/3066 |
| 2018/0062844 A1* | 3/2018 | Dubeuf | H04L 9/005 |
| 2019/0228164 A1* | 7/2019 | Shen | G06F 21/602 |

FOREIGN PATENT DOCUMENTS

EP    3 316 125 A1    5/2018

OTHER PUBLICATIONS

Hei et al., "Two Matrices for Blakley's Secret Sharing Scheme," IEEE International Conference on Communications (ICC), Jun. 10-15, 2012, Ottawa, Ontario, Canada, 5 pages.
(Continued)

*Primary Examiner* — Nelson S. Giddins
(74) *Attorney, Agent, or Firm* — SEED INTELLECTUAL PROPERTY LAW GROUP LLP

(57) ABSTRACT

Cryptographic circuitry, in operation, generates N first pairs of elliptic curve cryptography (ECC) keys r(i), R(i), with i varying from 1 to N, using K second pairs of ECC keys p(k), P(k), with k varying from 1 to K, wherein K is smaller than N. Each pair r(i), R(i) of the first pairs of keys is a linear combination of pairs of the second pairs of ECC keys according to:

$$\forall i \in [1; N] \begin{cases} r(i) = \sum_{j=1}^{K} A(i,j) * p(j) \\ R(i) = \sum_{j=1}^{K} A(i,j) * P(j) \end{cases},$$

wherein A(i,j) designates a general term of a matrix A of size N*K, and all the sub-matrices of size K*K are invertible. The cryptographic circuitry, in operation, executes cryptographic operations using one or more pairs of the first pairs of ECC keys.

24 Claims, 2 Drawing Sheets

(56) References Cited

OTHER PUBLICATIONS

Xin et al., "CPK Unified Identity Based Secure Remote Access System for Mobile Terminal," Fifth International Symposium on Computational Intelligence and Design, Oct. 28-29, 2012, Hangzhou, China, pp. 493-496.

* cited by examiner

KEYS FOR ELLIPTIC CURVE CRYPTOGRAPHY

BACKGROUND

Technical Field

The present disclosure generally concerns cryptography and its use for digital signatures and key agreements and, more particularly, elliptic curve cryptography. The present disclosure more particularly addresses the generation of a pair of keys for elliptic curve cryptography.

Description of the Related Art

Elliptic curve cryptography (ECC) is a type of cryptography using certain properties of elliptic curves. More particularly, cryptographic primitives compatible with elliptic curves have advantageous characteristics in terms of security and performance.

It would be desirable to be able to at least partly improve certain aspects of known methods and devices of generation of elliptic curve cryptography keys.

BRIEF SUMMARY

There is a need for faster methods of generation of elliptic curve cryptography keys.

There is a need for methods of generation of elliptic curve cryptography keys enabling to implement faster signature methods.

There is a need for methods of generation of elliptic curve cryptography keys enabling to implement faster key agreements methods.

There is a need for methods of generation of elliptic curve cryptography keys capable of being implemented by less powerful processors.

An embodiment facilitates addressing all or part of the disadvantages of known methods of generation of elliptic curve cryptography keys.

One embodiment provides a method of generation of N first pairs of ECC keys for elliptic curve cryptography, wherein each first pair of keys is a linear combination of previously-generated second pairs of elliptic curve cryptography keys.

According to an embodiment, the linear combination is an addition of some of said second pairs of keys.

According to an embodiment, said some second pairs of keys are randomly selected among the second pairs of ECC keys.

According to an embodiment, the method comprises a step of initialization of the N first pairs of keys before the application of the linear combination.

According to an embodiment, during the initialization step, the N first pairs of ECC keys are set to zero and to the point at infinity respectively.

According to an embodiment, during the initialization step, the N first pairs of keys are initialized to the value taken by the last generated first pair of keys.

According to an embodiment, during the initialization step, the N first pairs of keys (r(i), R(i)) are initialized to the value taken by one of the last W generated pair of keys (r(i−j), R(i−j)), where j<=W, j<I and j>=1.

According to an embodiment, N first pairs of elliptic curve cryptography keys r(i), R(i), with i varying from 1 to N, are generated using K previously-generated second pairs of elliptic curve cryptography keys p(k), P(k), with k varying from 1 to K, wherein K is smaller than N, and wherein the linear combination is:

$$\forall i \in [1; N] \begin{cases} r(i) = \sum_{j=1}^{K} A(i,j) * p(j) \\ R(i) = \sum_{j=1}^{K} A(i,j) * P(j) \end{cases},$$

wherein A(i,j) designates the general term of a matrix A of size N*K, all the sub-matrices of size K*K thereof being invertible.

According to an embodiment, matrix A is a Vandermonde matrix.

According to an embodiment, said first and second pairs of keys are formed of a scalar and of a point on an elliptic curve.

According to an embodiment, the number of second pairs of keys is smaller than N.

An embodiment provides a device capable of generating elliptic curve cryptography keys by implementing the disclosed method.

An embodiment provides a digital signature and/or key agreement method using elliptic curve cryptography keys generated by implementing the disclosed method.

An embodiment provides a digital signature and/or key agreement device capable of digital signature and/or key agreement by implementing the disclosed method.

In an embodiment, a method comprises generating, using cryptographic circuitry, N first pairs of elliptic curve cryptography (ECC) keys r(i), R(i), with i varying from 1 to N, using K second pairs of ECC keys p(k), P(k), with k varying from 1 to K, wherein K is smaller than N, and each pair r(i), R(i) of the first pairs of keys is a linear combination of pairs of the second pairs of ECC keys according to:

$$\forall i \in [1; N] \begin{cases} r(i) = \sum_{j=1}^{K} A(i,j) * p(j) \\ R(i) = \sum_{j=1}^{K} A(i,j) * P(j) \end{cases},$$

wherein A(i,j) designates a general term of a matrix A of size N*K, and all the sub-matrices of size K*K are invertible; and executing, using the cryptographic circuitry, cryptographic operations using one or more pairs of the first pairs of ECC keys.

In an embodiment, a device comprises: a memory; and cryptographic circuitry coupled to the memory. The cryptographic circuitry, in operation: generates N first pairs of elliptic curve cryptography (ECC) keys r(i), R(i), with i varying from 1 to N, using K second pairs of ECC keys p(k), P(k), with k varying from 1 to K, wherein K is smaller than N, and each pair r(i), R(i) of the first pairs of keys is a linear combination of pairs of the second pairs of ECC keys according to:

$$\forall i \in [1; N] \begin{cases} r(i) = \sum_{j=1}^{K} A(i, j) * p(j) \\ R(i) = \sum_{j=1}^{K} A(i, j) * P(j) \end{cases},$$

wherein A(i,j) designates a general term of a matrix A of size N*K, and all the sub-matrices of size K*K are invertible; and executes cryptographic operations using one or more pairs of the first pairs of ECC keys.

In an embodiment, a system comprises: functional circuitry; and cryptographic circuitry coupled to the functional circuitry. The cryptographic circuitry, in operation: generates N first pairs of elliptic curve cryptography (ECC) keys r(i), R(i), with i varying from 1 to N, using K second pairs of ECC keys p(k), P(k), with k varying from 1 to K, wherein K is smaller than N, and each pair r(i), R(i) of the first pairs of keys is a linear combination of pairs of the second pairs of ECC keys according to:

$$\forall i \in [1; N] \begin{cases} r(i) = \sum_{j=1}^{K} A(i, j) * p(j) \\ R(i) = \sum_{j=1}^{K} A(i, j) * P(j) \end{cases},$$

wherein A(i,j) designates a general term of a matrix A of size N*K, and all the sub-matrices of size K*K are invertible; and executes cryptographic operations using one or more pairs of the first pairs of ECC keys.

In an embodiment, a non-transitory computer-readable medium's contents configure cryptographic circuitry to perform a method. The method comprises: generating N first pairs of elliptic curve cryptography (ECC) keys r(i), R(i), with i varying from 1 to N, using K second pairs of ECC keys p(k), P(k), with k varying from 1 to K, wherein K is smaller than N, and each pair r(i), R(i) of the first pairs of keys is a linear combination of pairs of the second pairs of ECC keys according to:

$$\forall i \in [1; N] \begin{cases} r(i) = \sum_{j=1}^{K} A(i, j) * p(j) \\ R(i) = \sum_{j=1}^{K} A(i, j) * P(j) \end{cases},$$

wherein A(i,j) designates a general term of a matrix A of size N*K, and all the sub-matrices of size K*K are invertible; and executing cryptographic operations using one or more pairs of the first pairs of ECC keys.

BRIEF DESCRIPTION OF THE SEVERAL VIEWS OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, the general principles of elliptic curve cryptography are not reminded in the description of the embodiments.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front," "back," "top,", "bottom," "left," "right," etc., or to relative positional qualifiers, such as the terms "above," "below," "higher," "lower," etc., or to qualifiers of orientation, such as "horizontal," "vertical," etc., reference is made to the orientation shown in the figures.

Figure 1:
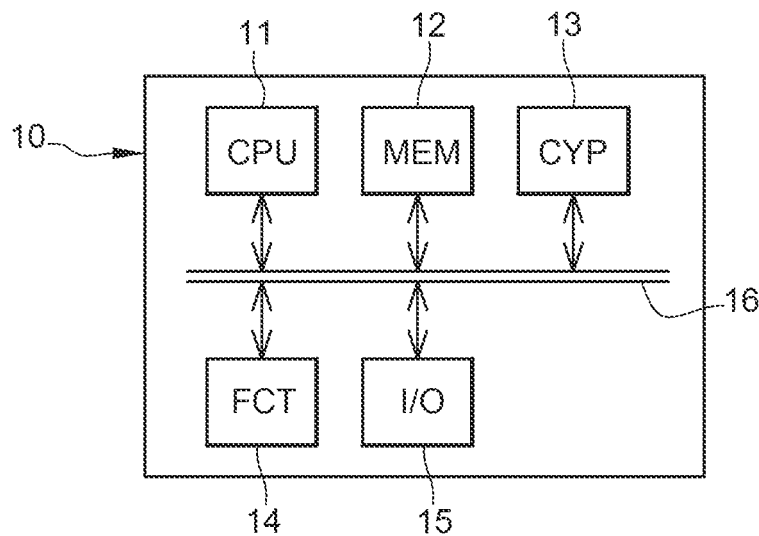
FIG. 1 very schematically shows in the form of blocks an embodiment of an electronic system.

FIG. 1 schematically shows in the form of blocks an electronic device 10.

Device 10 comprises:
  a processor (CPU) 11;
  a data storage unit or memory (MEM) 12 capable of comprising one or a plurality of memory circuits of different types;
  a cryptographic coprocessor (CYP) 13;
  one or a plurality of circuits (FCT) 14 capable of implementing specific functions of device 10; and
  optionally, for example, a communication unit or interface (I/O) 15 enabling device 10 to exchange data, for example, with other electronic devices.

The different elements comprised in device 10 are coupled together and capable of exchanging data over a data bus 16.

Processor 11 is capable of processing data stored in storage unit 12, and/or data originating from circuits 14 and from unit or interface 15.

Cryptographic coprocessor unit or circuit 13 is a processor capable of implementing modular arithmetic and elliptic curve operations. Cryptographic coprocessor unit 13 may form part of processor 11 or be the intermediary thereof with the elements of the device 10 with which it exchanges data. As an example, unit 13 may be used as an intermediary between unit 13 and processor 11, by processing the data which are being exchanged.

Figure 3:
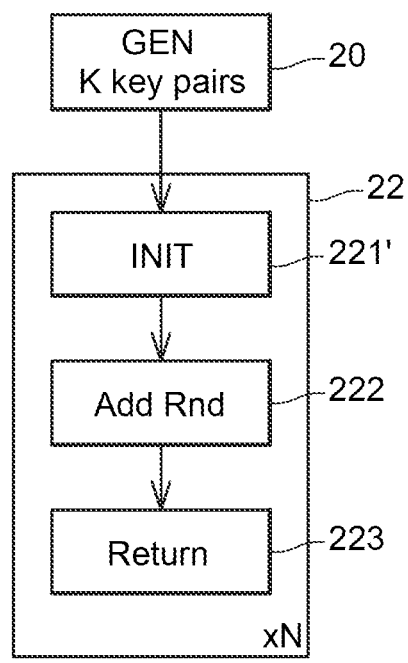
FIG. 3 shows, in the form of a flowchart, another embodiment of a method of generation of a pair of elliptic curve cryptography keys.
Figure 4:
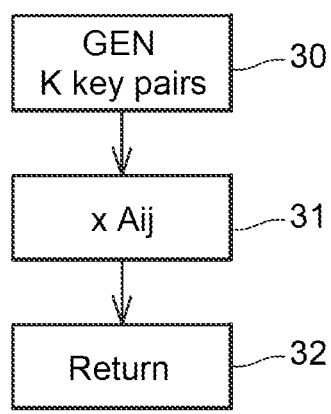
FIG. 4 shows, in the form of a flowchart, another embodiment of a method of generation of a pair of elliptic curve cryptography keys.

Cryptographic coprocessor unit 13 is more particularly capable of implementing digital signature and key agreement algorithms based on elliptic curve cryptography. In particular, cryptographic coprocessor 13 is capable of generating pairs of elliptic curve cryptography keys, or pairs of ECC keys, implementing methods of generation of pairs of keys such as those described in relation with FIGS. 2 to 4. The generation methods of FIGS. 2 to 4 are based on the fact that a linear combination of elliptic curve cryptography keys provides an elliptic curve cryptography key.

Cryptographic coprocessor 13 is further capable of using the pairs of elliptic curve cryptography keys in digital signature and/or key agreement algorithms.

Figure 2:
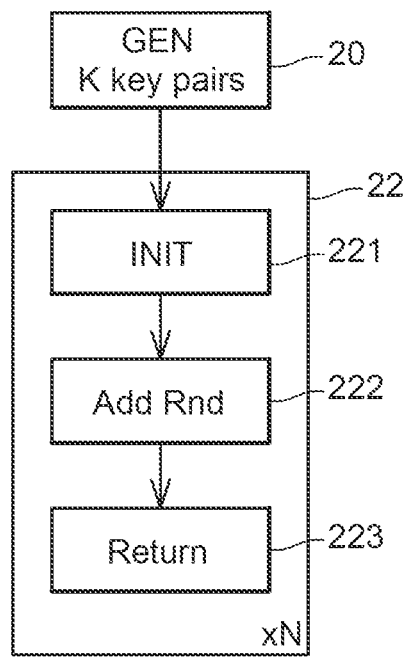
FIG. 2 shows, in the form of a flowchart, an embodiment of a method of generation of a pair of elliptic curve cryptography keys.

FIG. 2 is a flowchart illustrating an implementation mode of a method of generation of a plurality of pairs of ECC keys capable of being implemented by the device 10 described in relation with FIG. 1. More particularly, the method of FIG. 2 enables to generate N pairs of ECC keys (r(i), R(i)), with i varying from 1 to N, N being an integer. The pair of keys (r(i), R(i)) is formed of a scalar r(i), and of a point R(i) of an elliptic curve.

The method described herein enables to generate N pairs of ECC keys (r(i), R(i)) by using a linear combination of K pairs of ECC keys (p(k), P(k)), with k varying from 1 to K, K being an integer smaller than N. A pair of ECC keys (p(k), P(k)) is formed of a scalar p(k) and of a point P(k) of an elliptic curve.

At a preliminary step 20 (GEN K key pairs), the K pairs of ECC keys (p(k), P(k)) are generated by, for example, using current ECC key generation methods. The K pairs of ECC keys (p(k), P(k)) are for example pre-generated and then stored in a memory circuit.

At a step 22 subsequent to step 20, the N pairs of ECC keys (r(i), R(i)) are generated. For this purpose, each pair of ECC keys (r(i), R(i)) is generated one by one by using the three following steps:

a step 221 (Init) of initialization of the pair of ECC keys (r(i), R(i));

a step 222 (Add Rnd) of addition of pre-generated pairs of keys (p(k), P(k)) to the pair of ECC keys (r(i), R(i)); and a step 223 (Return) at which the pair of ECC keys (r(i), R(i)) is ready for use.

At step 221, the pair of ECC keys (r(i), R(i)) is set to zero. More particularly, scalar r(i) is zero, and point R(i) is set to the neutral element of the elliptic curve, also known as the point at infinity.

At step 222, a number C of randomly-selected pairs of ECC keys (p(k), P(k)) is added to pair of ECC keys (r(i), R(i)). More particularly, step 222 is a loop of C iterations during which a pair of ECC keys (p(k), P(k)) is randomly selected and then added to the pair of ECC keys (r(i), R(i)). More particularly, at each iteration, the scalar p(k) of the randomly selected pair of ECC keys (p(k), P(k)) is added to the scalar r(i) of the pair of ECC keys (r(i), R(i)). Similarly, at each iteration, the point P(k) of the randomly selected pair of ECC keys (p(k), P(k)) is added to the point R(i) of the pair of ECC keys (r(i), R(i)).

The larger number C, the larger the number N of pairs of ECC keys (r(i), R(i)) capable of being generated, and the better the security. But the larger number C, the more computation is needed. As an example, C is 32, K is 8 and N is 64.

At step 223, the pair of keys (r(i), R(i)) is ready to be used, it may for example be stored in a memory space.

Once a pair of keys (r(i), R(i)) has been generated, the method carries on to the generation of the next pair of keys (r(i+1), R(i+1)) until N pairs of keys have been generated.

An advantage of the method of generation of pairs of ECC keys described herein is that based on the conventional generation of the K pairs of ECC keys (p(k), P(k)), it enables to obtain N pairs of ECC keys (r(i), R(i)) by only performing additions, which are operations having a negligible calculation time as compared with the calculation time of a scalar multiplication operation. Thus, this method enables to generate N pairs of ECC keys faster. An example of application of this method is its use in a signature method.

FIG. 3 is a flowchart illustrating an implementation mode of a method of generation of a plurality of pairs of ECC keys capable of being implemented by the device 10 described in relation with FIG. 1. More particularly, the method of FIG. 2 enables to generate N pairs of ECC keys (r(i), R(i)), with i varying from 1 to N, N being an integer. The pair of keys (r(i), R(i)) is formed of a scalar r(i), and of a point R(i) of an elliptic curve.

The method described in relation with FIG. 3 is similar to the method described in relation with FIG. 2, only initialization step 221 is modified in an initialization step 221'. The elements common to the two methods will not be detailed again.

Like the method of FIG. 2, the method described herein enables to generate N pairs of ECC keys (r(i), R(i)) by using a linear combination of K pairs of ECC keys (p(k), P(k)), with k varying from 1 to K, K being an integer smaller than N. A pair of ECC keys (p(k), P(k)) is formed of a scalar p(k) and of a point P(k) of an elliptic curve P(k). The K pairs of ECC keys (p(k), P(k)) are pre-generated during the implementation of step 20.

At a step 22 subsequent to step 20, the N pairs of ECC keys (r(i), R(i)) are generated. For this purpose, each pair of ECC keys (r(i), R(i)) is generated one by one by using the three following steps:

a step 221' (Init) of initialization of the pair of ECC keys (r(i), R(i));

a step 222 (Add Rnd) of addition of pre-generated pairs of keys (p(k), P(k)) to the pair of ECC keys (r(i), R(i)); and a step 223 (Return) at which the pair of ECC keys (r(i), R(i)) is ready for use.

Step 221' differs from the step 221 described in relation with FIG. 2 in that the pair of ECC keys (r(i), R(i)) is not set to zero, but one of the previously-generated W pairs of ECC keys (r(i−j), R(i−j)), where j<=W, j<i, j>=1 and is an integer that is a parameter of the algorithm. More particularly, the first pair of keys (r(1), R(1)) is set to a first pair of values, for example, to zero and the point at infinity, after which the next ones take the value of one of the previous W pairs of ECC keys (r(i−j), R(i−j)), where j is a random integer between 1 and the maximum value between W and (i−1). For example, when the parameter W is chosen to be one, the pair of ECC keys (r(i), R(i)) is not set to zero, but to the previously-generated pair of ECC keys (r(i−1), R(i−1)). More specifically, the first pair of keys (r(1), R(1)) is set to a first pair of values, for example, to zero and the point at infinity, after which the next ones take the value of the directly previous pair of ECC keys (r(i−1), R(i−1)).

The method described in relation with FIG. 3 has the same advantages as the method of FIG. 2, but also additional advantages.

In particular, as compared with the method described in relation with FIG. 2, the method of FIG. 3 enables better security, as the number N of pairs of ECC keys (r(i), R(i)) capable of being generated becomes larger.

Further, once the N pairs of ECC keys (r(i), R(i)) have been generated, device 10, or more particularly cryptographic coprocessor 13, only uses M pairs of ECC keys (r(i), R(i)), M being a natural integer smaller than number N.

If number M is greater than number K, then the M pairs of ECC keys (r(i), R(i)) used by device 10, or cryptographic coprocessor 13, are linearly dependent. In other words, the inventors have shown that when M is greater than K, the pairs of ECC keys (r(i), R(i)) comply with the following formula:

$$\begin{cases} r(M) = \sum_{i=1}^{M-1} b(i) * r(i) \\ R(M) = \sum_{i=1}^{M-1} B(i) * R(i) \end{cases}$$

The determination of coefficients b(i) and B(i) is more difficult for the method described in relation with FIG. 3 than with the method described in relation with FIG. 2. As a result, the set of pairs of ECC keys (r(i), R(i)) that can be generated by this method is larger.

Still another advantage of this method is that the set of key pairs that can be generated by this method grows with N.

FIG. 4 is a flowchart illustrating an implementation mode of a method of generation of a plurality of pairs of ECC keys capable of being implemented by the device 10 described in relation with FIG. 1. More particularly, the method of FIG. 4 enables to generate N pairs of ECC keys (r(i), R(i)), with i varying from 1 to N, N being an integer. As previously described, the pair of keys (r(i), R(i)) is formed of a scalar r(i) and of a point R(i) of an elliptic curve.

Like the methods described in relation with FIGS. 2 and 3, the method described herein enables to generate N pairs of ECC keys (r(i), R(i)) by using a linear combination of K pairs of ECC keys (p(k), P(k)), with k varying from 1 to K, K being an integer smaller than N. A pair of ECC keys (p(k), P(k)) is formed of a scalar p(k) and of a point P(k) of an elliptic curve.

At a preliminary step 30 (GEN K key pairs), identical to the step 20 described in relation with FIG. 2, the K pairs of ECC keys (p(k), P(k)) are generated by using ECC key generation methods. The K pairs of ECC keys (p(k), P(k)) are for example pre-generated and then stored in a memory circuit.

At a step 31, the N pairs of ECC keys (r(i), R(i)) are generated. For this purpose, a vector comprising the K pairs of ECC keys (p(K), P(k)) is multiplied by a matrix A. Matrix A, having a general term A(i, j), has a size N*K, and is characterized by the fact that all its square sub-matrices of size K*K are invertible. Thus, the N pairs of ECC keys (r(i), R(i)) are provided by the following formulas:

$$\forall i \in [1; N] \begin{cases} r(i) = \sum_{j=1}^{K} A(i, j) * p(j) \\ R(i) = \sum_{j=1}^{K} A(i, j) * P(j) \end{cases}$$

An example of such a matrix is a Vandermonde matrix. Each row Row(i) of a Vandermonde matrix is defined as follows:

$$Row(i) = (1, c(i), (c(i))^2, \ldots, (c(i))^{K-1})$$

wherein c(i) is an integer, or a coefficient, different for each row of the Vandermonde matrix.

According to an example, if K is even, coefficients c(1), c(2), ..., c(K) are paired-up, and in each paired (c(i), c(i+1)), c(i+1) is equal to the opposite of c(i), noted −c(i). This presents the advantage of speeding the generation of the pair of keys associated with a row of the Vandermonde matrix. More particularly, a example of c(i) is the following:

$$c(i) = (-1)^{i+1} \left\lfloor \frac{i+1}{2} \right\rfloor$$

wherein $\lfloor d \rfloor$ represents the rounded-down value of the number d.

Another example of such a matrix A is a Pascal matrix which is defined as follows:

$$A(i, j) = \binom{i+j}{i} = \frac{(i+j)!}{i!(i+j-i)!} = \frac{(i+j)!}{i!\, j!}$$

wherein $$\binom{i+j}{i}$$

represents the binomial coefficient associated with i+j and j.

Another example of such a matrix A is a matrix from a family of matrices described in part II "The first matrix" of article entitled "Two matrices for Blakley's secret sharing scheme" written by Xiali Hei, Xiaojiang Du, Binheng Song and referenced ICC 2012: 810-814. Matrix A has a general form referenced 11-4 in said article.

For each example of the matrix A, it is important to choose convenient coefficients of the matrix A in order to improve the speed generation of a pair of keys associated with the matrix A. The person skilled in the art would be capable of choosing these convenient coefficients after reviewing the present disclosure.

At step 32, the N pairs of ECC keys (r(i), R(i)) are ready to be used, they may for example be stored in a memory space.

Further, once the N pairs of ECC keys (r(i), R(i)) have been generated, device 10, or more particularly cryptographic coprocessor 13, only uses M pairs of ECC keys (r(i), R(i)), M being a natural integer smaller than number N.

If number M is smaller than or equal to number K, then the M pairs of ECC keys (r(i), R(i)) used by device 10, or cryptographic coprocessor 13, are not linearly dependent. This provides a higher security to signatures generated by means of such a key.

Various embodiments and variants have been described. Those skilled in the art will understand that certain features of these various embodiments and variants may be combined, and other variants will occur to those skilled in the art.

Finally, the practical implementation of the described embodiments and variations is within the abilities of those skilled in the art based on the functional indications given hereabove. In particular, while the disclosure was described with respect to ECC, it could be applied to other finite groups in which keys are generated by scalar multiplication.

A method of generation of N first pairs of ECC keys for elliptic curve cryptography, wherein each first pair of keys may be a linear combination of previously-generated second pairs of elliptic curve cryptography keys.

The linear combination may be an addition of some of said second pairs of keys.

Said some second pairs of keys may be randomly selected among the second pairs of ECC keys.

The method may include a step of initialization (20, 30) of the N first pairs of keys before the application of the linear combination.

During the initialization step, the N first pairs of ECC keys may be set to zero and to the point at infinity respectively.

During the initialization step, the N first pairs of keys may be initialized to the value taken by the last generated first pair of keys.

During the initialization step, the N first pairs of keys (r(i), R(i)) may be initialized to the value taken by one of the last W generated pair of keys (r(i−j), R(i−j)), where j<=W, j<i and j>=1.

N first pairs of elliptic curve cryptography keys r(i), R(i), with i varying from 1 to N, may be generated using K previously-generated second pairs of elliptic curve cryptography keys p(k), P(k), with k varying from 1 to K, wherein K may be smaller than N, and wherein the linear combination may be:

$$\forall i \in [1; N] \begin{cases} r(i) = \sum_{j=1}^{K} A(i, j) * p(j) \\ R(i) = \sum_{j=1}^{K} A(i, j) * P(j) \end{cases},$$

wherein A(i,j) designates the general term of a matrix A of size N*K, all the sub-matrices of size K*K thereof being invertible.

Matrix A may be a Vandermonde matrix.

Said first and second pairs of keys may be formed of a scalar and of a point on an elliptic curve.

The number of second pairs of keys (K) may be smaller than N.

A device may be capable of generating elliptic curve cryptography keys by implementing the method.

A digital signature and/or key agreement method may use elliptic curve cryptography keys generated by implementing the method.

A digital signature and/or key agreement device may be capable of digital signature and/or key agreement by implementing the method.

In an embodiment, a method comprises generating, using cryptographic circuitry, N first pairs of elliptic curve cryptography (ECC) keys r(i), R(i), with i varying from 1 to N, using K second pairs of ECC keys p(k), P(k), with k varying from 1 to K, wherein K is smaller than N, and each pair r(i), R(i) of the first pairs of keys is a linear combination of pairs of the second pairs of ECC keys according to:

$$\forall i \in [1; N] \begin{cases} r(i) = \sum_{j=1}^{K} A(i, j) * p(j) \\ R(i) = \sum_{j=1}^{K} A(i, j) * P(j) \end{cases},$$

wherein A(i,j) designates a general term of a matrix A of size N*K, and all the sub-matrices of size K*K are invertible; and executing, using the cryptographic circuitry, cryptographic operations using one or more pairs of the first pairs of ECC keys. In an embodiment, the linear combination is an addition of some of said second pairs of keys. In an embodiment, said some second pairs of keys are randomly selected among the second pairs of ECC keys. In an embodiment, the method comprises initialization of the N first pairs of keys before the application of the linear combination. In an embodiment, during the initialization, the N first pairs of ECC keys are set to zero and to the point at infinity respectively. In an embodiment, during the initialization, the N first pairs of keys are initialized to the value taken by the last generated first pair of keys. In an embodiment, during the initialization, the N first pairs of keys (r(i), R(i)) are initialized to the value taken by one of the last W generated pair of keys (r(i−j), R(i−j)), where j<=W, j<i and j>=1. In an embodiment, matrix A is a Vandermonde matrix. In an embodiment, said first and second pairs of keys are formed of a scalar and of a point on an elliptic curve. In an embodiment, the cryptographic operations include: generating a digital signature; generating a key agreement; or combinations thereof. In an embodiment, the method comprises: generating the K second pairs of ECC keys; and storing the generated K pairs of ECC keys.

In an embodiment, a device comprises: a memory; and cryptographic circuitry coupled to the memory. The cryptographic circuitry, in operation: generates N first pairs of elliptic curve cryptography (ECC) keys r(i), R(i), with i varying from 1 to N, using K second pairs of ECC keys p(k), P(k), with k varying from 1 to K, wherein K is smaller than N, and each pair r(i), R(i) of the first pairs of keys is a linear combination of pairs of the second pairs of ECC keys according to:

$$\forall i \in [1; N] \begin{cases} r(i) = \sum_{j=1}^{K} A(i, j) * p(j) \\ R(i) = \sum_{j=1}^{K} A(i, j) * P(j) \end{cases},$$

wherein A(i,j) designates a general term of a matrix A of size N*K, and all the sub-matrices of size K*K are invertible; and executes cryptographic operations using one or more pairs of the first pairs of ECC keys. In an embodiment, the linear combination is an addition of some of said second pairs of keys. In an embodiment, said some second pairs of keys are randomly selected among the second pairs of ECC keys. In an embodiment, the cryptographic circuitry, in operation, initializes the N first pairs of keys before performing the linear combinations. In an embodiment, during the initialization, the N first pairs of ECC keys are set to zero and to the point at infinity respectively. In an embodiment, during the initialization, the N first pairs of keys are initialized to the value taken by the last generated first pair of keys. In an embodiment, during the initialization, the N first pairs of keys (r(i), R(i)) are initialized to the value taken by one of the last W generated pair of keys (r(i−j), R(i−j)), where j<=W, j<i and j>=1. In an embodiment, matrix A is a Vandermonde matrix. In an embodiment, the cryptographic operations include: generating a digital signature; generating a key agreement; or combinations thereof. In an embodiment, the memory, in operation, stores the generated K pairs of ECC keys.

In an embodiment, a system comprises: functional circuitry; and cryptographic circuitry coupled to the functional circuitry. The cryptographic circuitry, in operation: generates N first pairs of elliptic curve cryptography (ECC) keys r(i), R(i), with i varying from 1 to N, using K second pairs of ECC keys p(k), P(k), with k varying from 1 to K, wherein K is smaller than N, and each pair r(i), R(i) of the first pairs of keys is a linear combination of pairs of the second pairs of ECC keys according to:

$$\forall i \in [1;N] \begin{cases} r(i) = \sum_{j=1}^{K} A(i,j) * p(j) \\ R(i) = \sum_{j=1}^{K} A(i,j) * P(j) \end{cases},$$

wherein A(i,j) designates a general term of a matrix A of size N*K, and all the sub-matrices of size K*K are invertible; and executes cryptographic operations using one or more pairs of the first pairs of ECC keys. In an embodiment, the cryptographic circuitry, in operation, initializes the N first pairs of keys before performing the linear combinations. In an embodiment, matrix A is a Vandermonde matrix. In an embodiment, the system comprises a processor coupled to the functional circuitry and the cryptographic circuitry, and the processor, in operation, exchanges data with the cryptographic circuitry.

In an embodiment, a non-transitory computer-readable medium's contents configure cryptographic circuitry to perform a method. The method comprises: generating N first pairs of elliptic curve cryptography (ECC) keys r(i), R(i), with i varying from 1 to N, using K second pairs of ECC keys p(k), P(k), with k varying from 1 to K, wherein K is smaller than N, and each pair r(i), R(i) of the first pairs of keys is a linear combination of pairs of the second pairs of ECC keys according to:

$$\forall i \in [1;N] \begin{cases} r(i) = \sum_{j=1}^{K} A(i,j) * p(j) \\ R(i) = \sum_{j=1}^{K} A(i,j) * P(j) \end{cases},$$

wherein A(i,j) designates a general term of a matrix A of size N*K, and all the sub-matrices of size K*K are invertible; and executing cryptographic operations using one or more pairs of the first pairs of ECC keys. In an embodiment, the method comprises initializing the N first pairs of keys before application of the linear combination. In an embodiment, the content comprise instructions executable by the cryptographic circuitry.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
generating, using cryptographic circuitry, N first pairs of elliptic curve cryptography (ECC) keys r(i), R(i), with i varying from 1 to N, using K second pairs of ECC keys p(k), P(k), with k varying from 1 to K, wherein K is smaller than N, and each pair r(i), R(i) of the first pairs of keys is a linear combination of pairs of the second pairs of ECC keys according to:

$$\forall i \in [1;N] \begin{cases} r(i) = \sum_{j=1}^{K} A(i,j) * p(j) \\ R(i) = \sum_{j=1}^{K} A(i,j) * P(j) \end{cases},$$

wherein A(i,j) designates a general term of a matrix A of size N*K, and all sub-matrices of size K*K are invertible; and
executing, using the cryptographic circuitry, cryptographic operations using one or more pairs of the first pairs of ECC keys.

2. The method according to claim 1, comprising initialization of the N first pairs of keys before the application of the linear combination.

3. The method according to claim 2, wherein during the initialization, the N first pairs of ECC keys are set to zero and to the point at infinity, respectively.

4. The method according to claim 2, wherein during the initialization, the N first pairs of keys are initialized to the value taken by the last generated first pair of keys.

5. The method according to claim 2, wherein during the initialization, the N first pairs of keys (r(i), R(i)) are initialized to the value taken by one of the last W generated pair of keys (r(i−j), R(i−j)), where j<=W, j<i and j>=1.

6. The method according to claim 1, wherein matrix A is a Vandermonde matrix.

7. The method according to claim 1, wherein the first and second pairs of keys are formed of a scalar and of a point on an elliptic curve.

8. The method of claim 1, wherein the cryptographic operations include:
   generating a digital signature;
   generating a key agreement; or
   combinations thereof.

9. The method of claim 1, comprising:
   generating the K second pairs of ECC keys; and
   storing the generated K pairs of ECC keys.

10. A device, comprising:
   a memory; and
   cryptographic circuitry coupled to the memory, wherein the cryptographic circuitry, in operation:
      generates N first pairs of elliptic curve cryptography (ECC) keys r(i), R(i), with i varying from 1 to N, using K second pairs of ECC keys p(k), P(k), with k varying from 1 to K, wherein K is smaller than N, and each pair r(i), R(i) of the first pairs of keys is a linear combination of pairs of the second pairs of ECC keys according to:

$$\forall i \in [1; N] \begin{cases} r(i) = \sum_{j=1}^{K} A(i,j) * p(j) \\ R(i) = \sum_{j=1}^{K} A(i,j) * P(j) \end{cases},$$

wherein A(i,j) designates a general term of a matrix A of size N*K, and all sub-matrices of size K*K are invertible; and
   executes cryptographic operations using one or more pairs of the first pairs of ECC keys.

11. The device according to claim 10, wherein the cryptographic circuitry, in operation, initializes the N first pairs of keys before performing the linear combinations.

12. The device according to claim 11, wherein during the initialization, the N first pairs of ECC keys are set to zero and to the point at infinity, respectively.

13. The device according to claim 11, wherein during the initialization, the N first pairs of keys are initialized to the value taken by the last generated first pair of keys.

14. The device according to claim 11, wherein during the initialization, the N first pairs of keys (r(i), R(i)) are initialized to the value taken by one of the last W generated pair of keys (r(i−j), R(i−j)), where j<=W, j<i and j>=1.

15. The device according to claim 10, wherein matrix A is a Vandermonde matrix.

16. The device of claim 10, wherein the cryptographic operations include:
   generating a digital signature;
   generating a key agreement; or
   combinations thereof.

17. The device of claim 10, wherein the memory, in operation, stores the generated K pairs of ECC keys.

18. A system, comprising:
   functional circuitry; and
   cryptographic circuitry coupled to the functional circuitry, wherein the cryptographic circuitry, in operation:
      generates N first pairs of elliptic curve cryptography (ECC) keys r(i), R(i), with i varying from 1 to N, using K second pairs of ECC keys p(k), P(k), with k varying from 1 to K, wherein K is smaller than N, and each pair r(i), R(i) of the first pairs of keys is a linear combination of pairs of the second pairs of ECC keys according to:

$$\forall i \in [1; N] \begin{cases} r(i) = \sum_{j=1}^{K} A(i,j) * p(j) \\ R(i) = \sum_{j=1}^{K} A(i,j) * P(j) \end{cases},$$

wherein A(i,j) designates a general term of a matrix A of size N*K, and all sub-matrices of size K*K are invertible; and
   executes cryptographic operations using one or more pairs of the first pairs of ECC keys.

19. The system according to claim 18, wherein the cryptographic circuitry, in operation, initializes the N first pairs of keys before performing the linear combinations.

20. The system according to claim 18, wherein matrix A is a Vandermonde matrix.

21. The system according to claim 18, comprising a processor coupled to the functional circuitry and the cryptographic circuitry, wherein the processor, in operation, exchanges data with the cryptographic circuitry.

22. A non-transitory computer-readable medium having contents which configure cryptographic circuitry to perform a method, the method comprising:
   generating N first pairs of elliptic curve cryptography (ECC) keys r(i), R(i), with i varying from 1 to N, using K second pairs of ECC keys p(k), P(k), with k varying from 1 to K, wherein K is smaller than N, and each pair r(i), R(i) of the first pairs of keys is a linear combination of pairs of the second pairs of ECC keys according to:

$$\forall i \in [1; N] \begin{cases} r(i) = \sum_{j=1}^{K} A(i,j) * p(j) \\ R(i) = \sum_{j=1}^{K} A(i,j) * P(j) \end{cases},$$

wherein A(i,j) designates a general term of a matrix A of size N*K, and all sub-matrices of size K*K are invertible; and
   executing cryptographic operations using one or more pairs of the first pairs of ECC keys.

23. The non-transitory computer-readable medium of claim 22, wherein the method comprises initializing the N first pairs of keys before application of the linear combination.

24. The non-transitory computer-readable medium of claim 22, wherein the contents comprise instructions executable by the cryptographic circuitry.

* * * * *